United States Patent

[11] 3,568,126

[72] Inventors Ulrich Armonier
Simmelsdorf;
Norbert Aberger; Helmut Rolf, Nurnberg, Germany

[21] Appl. No. 782,576
[22] Filed Dec. 10, 1968
[45] Patented Mar. 2, 1971
[73] Assignee International Standard Electric Corporation
New York, N.Y.
[32] Priority Dec. 27, 1967
[33] Germany
[31] 1,591,599

[54] TUNING ARRANGEMENT FOR STORABLE STATION SELECTION IN TELEVISION RECEIVERS
6 Claims, 8 Drawing Figs.

[52] U.S. Cl. .......... 338/129, 338/123, 338/181
[51] Int. Cl. .......... H01c 1/12, H01c 9/02
[50] Field of Search .......... 338/122, 123, 128, 129, 134, 181

[56] References Cited
UNITED STATES PATENTS

| | | | |
|---|---|---|---|
| 1,897,596 | 2/1933 | Tietz .......... | 338/123X |
| 2,091,371 | 8/1937 | McMaster .......... | 338/181 |
| 3,230,491 | 1/1966 | Dreyfus .......... | 338/123 |

*Primary Examiner*—Lewis H. Myers
*Assistant Examiner*—Gerald P. Tolin
*Attorneys*—Charles L. Johnson, Jr., C. Cornell Remsen, Jr., Walter J. Baum, Percy P. Lantzy, Philip M. Bolton and Isidore Togut

ABSTRACT: A tuning arrangement for television receivers including a rotatable knob for coarse tuning of various stations to be received and having predetermined fixed positions into which said knob may be set, a single tuning button having beveled gear means at one end thereof mounted on said knob, a plurality of stationary potentiometers mounted concentrically with said knob, one being opposite each of said fixed positions, and each having gear means associated therewith for engagement with, and adjustment by, said button, said button further having spring return means enabling movement of said button into and out of engagement with the potentiometers.

INVENTORS

ULRICH ARMONIER
NORBERT ABERGER
HELMUT ROLF

BY Philip M. Bolton

ATTORNEY

INVENTORS
ULRICH ARMONIER
NORBERT ABERGER
HELMUT ROLF
BY Philip M. Bolton
ATTORNEY

TUNING ARRANGEMENT FOR STORABLE STATION SELECTION IN TELEVISION RECEIVERS

BACKGROUND OF THE INVENTION

The present invention relates to a tuning arrangement for effecting the storable selection of stations or transmitters in television receivers, in which an associated tuning means, by actuating a rotary selector provided with engaging positions, is capable of being moved into a position corresponding to the respective tuning. There is a need for the invention, for example, in arrangements for effecting the storable tuning to stations lying within the VHF-and UHF-range.

In a conventional embodiment of such a type of tuning arrangement a toothed rack spindle is used for effecting the setting of the associated tuning means, with a selector head with adjacent adjustable screw spindles arranged concentrically in relation to the toothed rack spindle, being arranged on the said toothed rack spindle. The selector head, in common with the toothed rack spindle and a toothed wheel seated thereon, can be readjusted in the axial direction and in the direction of rotation by readjusting the control button. The number of screw spindles equally distributed on the selector head, is dependent upon the desired number of stations to be tuned-in. For the purpose of effecting the setting or adjustment of the screw spindles, the shaft or axis of the control button is provided with a cavity in which there is arranged a setting member resembling a screwdriver, which is capable of being operated from outside the receiver. The setting of the rotary selector is effected in a step-by-step manner from on engaging position to the next one, in which each time associated screw spindle is applied to a cam plate under the action of a spring. In this way, when turning the selector head into the next engaging position, the previously effective screw spindle becomes disengaged, whereas the following screw spindle, during the continued rotation, will be applied to the cam plate. In so doing, the rotor member of the rotary selector is readjusted in the axial direction in accordance with the respective previous setting of the associated screw spindle and, consequently, also the respectively associated tuning means, such as the potentiometer serving the electrical tuning.

Accordingly, in this way it is possible, by readjusting the screw spindles from the outside, to adjust a station to each engaging position of the rotary selector, which is then stored, and can be reselected again by turning the rotary selector into the corresponding rotary position. In the known case, and in addition thereto, there are provided switchover means suitable for effecting the setting from the outside of the receiver, and distributed in accordance with the engaging positions of the rotary selector via which, according to requirements, there is effected the switching on of the VHF-or UHF-range.

The conventional tuning arrangement employing a rotary selector, of course, has the advantage over pushbutton selector, comprising an equal number of setting or adjusting possibilities, that the space requirement on the front panel of the receivers is relatively small, but the tuning with the aid of screw spindles capable of being adjusted from the outside, and the auxiliary constructional means cooperating therewith (toothed rack spindle, cam bodies, selector head, toothed wheels, setting spindle, selector disc etc.) requires relatively much space in direction vertically to the front side of the receiver which, in many cases is not in agreement with the actually available space.

Moreover, as regards such types of tuning arrangements, a certain difficulty is seen in that during the turning of the rotary selector for effecting the switching on of a receiving frequency, or else by an unintended movement, such as accidentally when dusting, the adjusting spindle is turned, thus varying or changing the stored tuning. Furthermore, also the mechanical expenditure in this conventional arrangement is a rather considerable one, especially because there care has to be taken that for the purpose of turning the selector head, the actuating members must be cleared out of the way of the screw spindles.

In addition thereto, it results as a disadvantage of the conventional tuning arrangement that the accuracy of recurrence of the stored stations is naturally not very high, because the tuning means, e.g. the potentiometer, is coupled to the rotary selector while changing the rotary position thereof, and is each time set in accordance with the position of the screw spindle.

The invention is based on the problem of improving a rotary selector of the described type by utilizing its well known advantage of requiring little space on the front side of the receiver, in so far as to be characterized by a very simple, compact and flat construction, by an easy operability, a high operational reliability, and a high accuracy of recurrence of the adjusted or tuned-in stations.

SUMMARY OF THE INVENTION

According to the invention there is provided, in a tuning arrangement for receivers, a rotatable knob for selecting various stations to be received, means for establishing predetermined fixed positions into which said knob can be set, a single tuning button mounted on said knob, and a plurality of stationary adjustable tuning means mounted concentrically with respect to said and each located opposite one of said predetermined positions, said mounting means including means for mounting said tuning button so as to enable movement of said button into and out of engagement with the tuning means at each said position.

In one advantageous further embodiment of the invention several of the tuning means which are arranged concentrically in relation to the rotary selector axis, are capable of being tuned through the entire frequency range assigned thereto, whereas to the remaining tuning means there is each time assigned one fixed channel, so that these tuning means are merely capable of being readjusted within a rang range of fine tuning. In this respect it may be of advantage to employ as the through-tunable tuning means spindle types of potentiometers, and rotary potentiometers as the means for effecting the fine tuning. For the purpose of transferring the rotary movement between the tuning element and these potentiometers it is of advantage to use roller gearings, in particular a bevel gearing, with the driving wheels thereof, upon actuation of the tuning element, capable of being brought into an operational connection with one another. A further advantage results from the fact that the tuning element is designed capable of being turned and depressed without employing any locating devices so that it, when depressed, can be brought into readiness for tuning with the respective potentiometer, while returning automatically to normal when being switched off. Moreover, it is of advantage to deposit the resistors of the potentiometers, as well as the most substantial electrical conductors on to a board of insulating material serving at the same time for holding in position the potentiometers in accordance with the known printed circuit technique. By employing the invention it is possible to achiever the advantage that by using one rotary knob (control button) only, and one tuning knob (button) only, for all stations, there will result a very simple and weight-saving construction, because the tuning knob can be omitted with respect to the individual stations. Moreover, from this there results a particularly easy operability of the tuning arrangement. It is to be regarded as a particular advantage that the tuning arrangement, as seen on the whole, forms a somewhat extremely flat square body and is therefore in a very favorable construction space relationship. A further advantage resides in the fact that already tuned-in stations are prevented from being accidentally readjusted, because subsequently to the tuning, the associated potentiometers are no longer coupled to the tuning element. It is also of advantage that the number of previously given or freely selectable stations can be either enlarged or reduced at any time without requiring any constructional alterations. A still further advantage results from the high accuracy of recurrence of the adjusted stations, because for each stored station there is provided a potentiometer of its own with sliders which, in addition thereto, is arranged stationarily. Moreover, the invention safeguards a continuous high-accuracy tuning without any backlash which is compulsorily effected owing to the gearing systems which are in engagement with one another and, on the other hand, also by the relatively high transmission ratio within the UHF-range which is due to the use of spindle potentiometers, and within the VHF-range, owing to the use of rotary potentiometers with the resistance thereof amounting to a fraction of the total resistance.

BRIEF DESCRIPTION OF THE DRAWINGS

For enabling a better understanding of the invention, the latter will now be explained in detail with reference to an example of embodiment shown in FIGS. 1 to 4 of the accompanying drawings, in which.

DESCRIPTION OF THE PREFERRED EMBODIMENT

Figures 1, 1A:
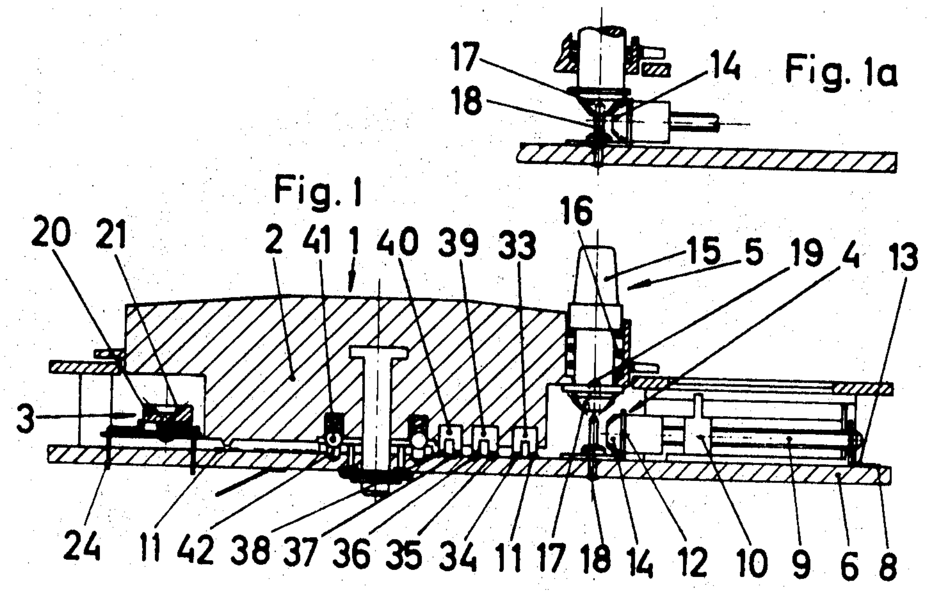
FIG. 1 shows an arrangement with a storable tuning in a longitudinal section taken on the line A—B through the arrangement according to FIG. 2.
FIG. 1*a* shows one detail of the arrangement according to FIG. 1 with the tuning knob in the actuated condition.
Figure 2:
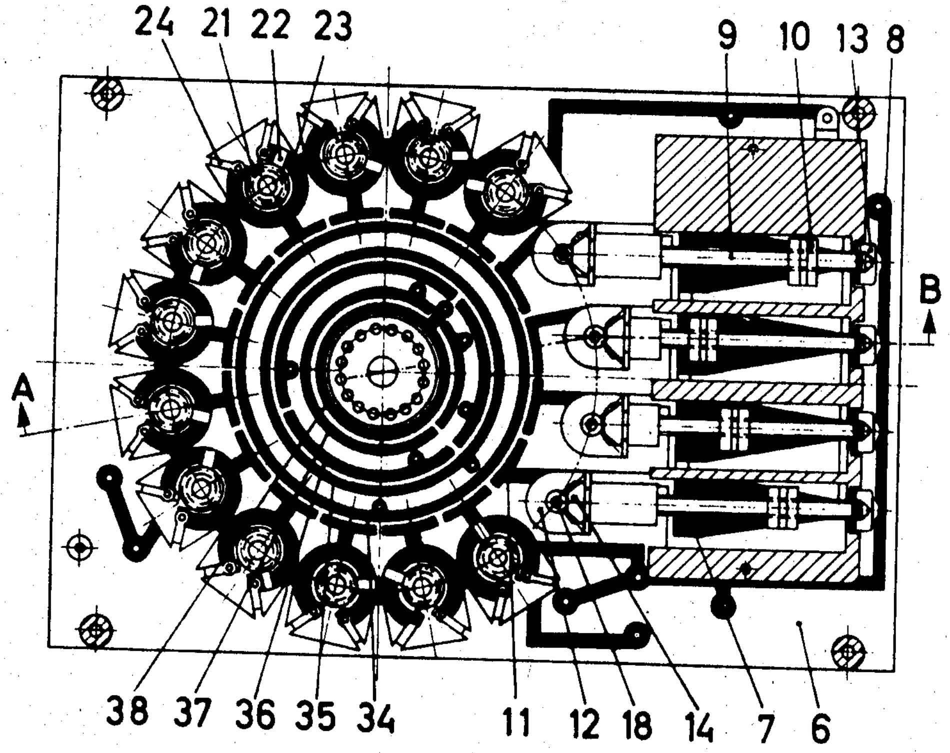
FIG. 2 shows the tuning arrangement according to FIG. 1 with the rotary button removed, in a cross-sectional view along a sectional line extending closely below the cover plate.

According to FIGS. 1 and 2 the tuning arrangement substantially consists of the rotary selector 1 with the aid of which the tuning means 3, 4 which are arranged on a concentrical circle, the potentiometers, as well as the stations associated therewith, can be switched on automatically. The rotary selector 1 chiefly consists of the rotary knob 2 and the tuning element 5 which is common to all tuning means 3, 4, and which is arranged in an outer range of the rotary button and by which, by way of pressing and turning, there can be effected the desired assignment of a station to one of the tuning means. Appropriately the rotary button 2 of the rotary selector 1 has a somewhat T-shaped cross section so that the tuning element 5 can be supported in the cross section reduced portion of the rotary knob, thus permitting the tuning means 3, 4, at least partly, to project into the annular recess of the rotary button.

Out of the shown tuning means 3, 4 which are associated with various frequency ranges, for example, twelve can be intended for VHF-channels, and for four UHF-channels. The four tuning means 4 of the UHF-channels are each time capable of being tuned through the entire UHF-range, whereas within the VHF-range, one fixed channel is assigned to each of the 12 tuning means 3 which is merely capable of being adjusted within a fine-tuning range. Of course, it is not necessary to restrict the number of ranges which are capable of being tuned through, to the number of four; in fact, it is equally well possible to arrange more or less of such tuning means 4 in combination with a smaller or larger number of tuning means 3 which are suitable for effecting the fine tuning. It is of particular interest, for example, to the American market to provide the number ratio as stated hereinbefore, of twelve tuning means suitable for effecting the fine to four tuning means suitable for effecting the through-tuning.

In particular, the tuning arrangements shown in FIGS. 1 and 2 performs the following functions:

The setting of the rotary selector 1 is effected in a step-by-step manner from one engaging position to the next one. For example, if one of the tuning means 3 which are capable of effecting the fine tuning, is supposed to be set to the frequency which is received at the respective receiving site or location, then the rotary selector 1 is first of all turned and engaged to the desired channel which may be marked in any suitable way on the rotary knob 2. By actuating the tuning element 5, i.e. upon depression into the limiting stop position and a simultaneous turning, the latter may now be brought into an operational connection with the associated tuning means 3, and the tuning means coupled thereto, may be tuned to the respective receiving frequency. This setting is effected independently of other settings, so that the tuning of a tuning means 3 after having been carried out once, will always remain to be stored until there is effected or carried out an intended alteration by means of the tuning element 5. Upon turning the rotary selector 1 into the same marked engaging position, a setting will thus always be effected to the same receiving frequency. The fine tuning of another tuning means 3 to the frequency associated therewith, is likewise effected in the described way. In the same manner, and by turning the rotary selector 1 into an engaging position associated with the tuning means 4 which are suitable for effecting the through-tuning, and by subsequently actuating the tuning element 5, it is possible to carry out a tuning, in the described way, to any desired frequency within a predetermined frequency range which likewise remains to be stored until a new setting or adjustment is desired. After having each time effected the desired fine tuning of a tuning means 3 or the assignment of a station to a tuning means 4 by actuating the tuning element 5, the latter may return to its normal position, thus each time separating the operational connection between the tuning element and the tuning means.

For the purpose of effecting the tuning to individual channels there is appropriately used at least one varactor (variable capacitance) diode which is inserted in the capacitance path of the oscillating circuit, with the capacitance value thereof being adjusted by a variable reverse voltage. These control voltages for the varactor diode are taken from a number of variable voltage dividers corresponding to the number of selectable stations. To this end, and in the case of the freely selectable stations, there are used resistance leads 7 extending parallel in relation to one another and deposited on a board of insulating material 6, such as a hard-paper board, in accordance with the printed circuit technique, with the effective surface resistance of these resistance leads changing in accordance with the predetermined characteristic of the varactor diode. Accordingly, the number of applied resistance layers 7 corresponds to the number of the desired stations lying within one frequency range and which, in this particular case, is arbitrarily assumed to be four. In the conventional way, these resistance leads can be produced by forming layers of carbon or graphite. Just as the resistance leads 7, also the contact leads 8 serving to establish the electrical connection as such, and the electrical connection of the resistance tracks, can be manufactured in accordance with the known printed circuit technique. To each resistance lead 7 there is assigned one spindle-type potentiometer, the spindle 9 of which is acted upon by a contact slider 10 with the aid of which a certain partial voltage is tapped, and the thus tapped potential is transferred to a section 11 of the contact lead arranged concentrically in relation to the rotary knob 2. Accordingly, in so far each of the resistance leads 7, in connection with an associated contact slider 10, constitutes a potentiometer. The voltages as tapped via the resistance leads 7 serve to control the varactor diode of one selection stage.

Each spindle 9 of the spindle-type potentiometer is pivoted in holding arrangements 12, 13 which are in such a way mounted to the board of insulation material 6, that the spindle shafts extend vertically in relation to the axis of rotation of the rotary knob 2 and parallel in relation to one another. To the one end of the spindle shaft which is supported in the holding arrangement 12, there is mounted a bevel gear 14 which is capable of being coupled to a bevel-gear drive operable by the tuning element 5. For this purpose the one end of the tuning element 5 carries a tuning knob 15 extending in direction of the axis of rotation of the rotary knob the rotary knob 2, with this tuning knob 15 capable of being readjusted in a straight-line fashion in the direction of its axis of rotation and in opposition to the action of a spring 16. The other end of the tuning element 5 is designed as a bevel gear 17, and cooperates with the bevel gear 14 of the spindle-type potentiometer upon depression of the tuning knob 15. In order to safeguard an unobjectionable rotary movement of the tuning knob 15 without causing any sideway displacement of the axis of rotation of the spindle-type potentiometer during the tuning, in other words, in order to prevent the tangential forces appearing in the course of this, from being transferred to the engaging position of the rotary button 2, the tuning knob is guided is a sliding fit by a centering pin 18 extending in direction of the axis of rotation of the tuning knob, and rivetted to the board of insulating material 6. To this end the centering pin 18 in the depressed condition of the tuning knob 15 is in engagement with a borehole 19 of the bevel gear 17. One such position of the tuning knob 15 may be taken from the showing of FIG. 1*a* which, at the same time, also illustrates the cooperation of the two bevel gears 14, 17 during the tuning process.

Concentrically in relation to the rotary button 2, the suitable tuning means 3 which are suitable for effecting the fine tuning, are arranged in such a way as to be seated together with the tuning means 4 (spindle potentiometers) on a circle whose radius corresponds to the distance constituted by the axes of rotation of the rotary knob 2 and of the tuning knob 15. In this way it is possible to tune also the tuning means 3 with the aid of the tuning element 5 which, accordingly, is provided in common to all tuning means 3, 4. The tuning means 3 again chiefly consist of potentiometers which may be designed in various ways. Suitable to this end are, for example, trimming potentiometers of the type known per se, with the rotor 20 thereof being provided with an internal gear 21 capable of being brought into an operational connection with the bevel-gear drive of the tuning element 5 as soon as the bevel-gear 17 of the tuning knob 15 comes to lie vertically above the internal gear of the rotor. Accordingly, upon pressing and turning the turning knob 15, the rotary movement thereof is transferred via the bevel-gear 17 and the internal gear 21 to the rotor 20, and the associated potentiometer, within a defined range of fine tuning, is tuned to the desired frequency. To this end there is provided the slide spring 22 sliding on the resistance ring 23 and tapping a certain partial voltage. The thus tapped potential is in turn transferred to a section of the contact lead 11 arranged concentrically in relation to the rotary knob 2. For effecting the electrical connection of the resistance rings 23 there are provided the connecting ends or terminals 24 which are arranged on the side of the board of insulating material 6 not facing the resistance rings.

Figures 3, 3A, 3B:
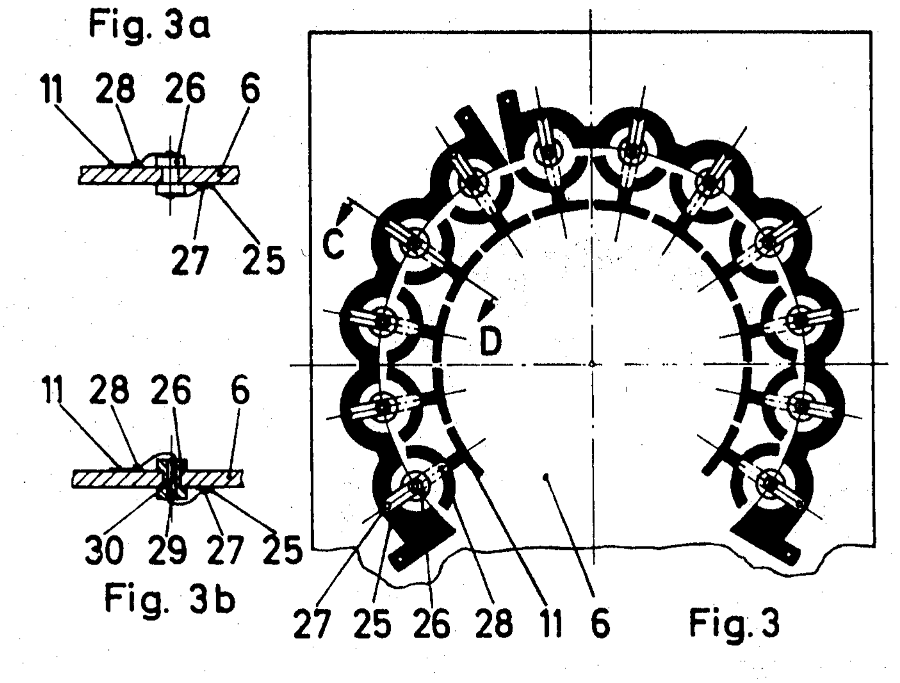
FIG. 3 shows a modification of the arrangement as shown in FIG. 2.
FIGS. 3*a* and 3*b* each show one detail of the arrangement according to FIG. 3 in a sectional view taken on the line C—D of FIG. 3.

It is of a particular advantage, however, if, instead of the trimming resistors, carbon or graphite resistance layers 25 are deposited on to the board of insulating material 6 in accordance with the known printed circuit technique, and to assign to each of such resistance lead one rotor in the form of a mechanical sleeve (hub, jack) 26 comprising slide springs 27, 28, as is shown in FIGS. 3, 3*a* and 3*b*. In these arrangements the mechanical sleeves 26 are rotatably supported in the board of insulating material 6 and are provided with an internal gear 21 on the side facing the tuning element 5, with this internal gear 21, in turn, capable of being brought into engagement with the bevel gear 17 of the tuning element 5 when depressing the tuning button 15. Of the slide springs 27, 28 which are riveted to the mechanical sleeve 26 (FIG. 3*a*) in the form of self-resilient flat springs, or else as parts of a substantially S-shaped flat spring 30 (FIG. 3*b*) which is retained in a borehole 29 of the mechanical sleeve 26, the slide spring 27 is in a continuous electrical connection with the resistance lead 25, whereas the slide a spring 28 is continuously electrically connected to a section 11 of the contact lead associated with the resistance lead. In this way it is possible, with the aid of the slide spring 27, to effect the tapping of a predetermined partial voltage, and to transfer the thus tapped potential either via the mechanical sleeve 26, or directly to the slide spring 28 and, consequently, to the section 11 of the contact lead. In the arrangement shown in FIGS. 3, 3*a* and 3*b*, these sections 11 of the contact lead are arranged on that particular side of the board of insulating material 6 not facing the resistance leads 25.

Figure 4A:
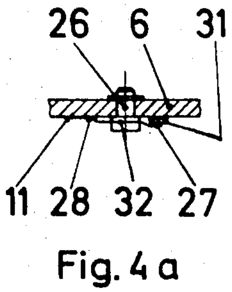
FIG. 4*a* shows one detail of the arrangement according to FIG. 4 in a sectional view taken on the line E—F of FIG. 4.
Figure 4:
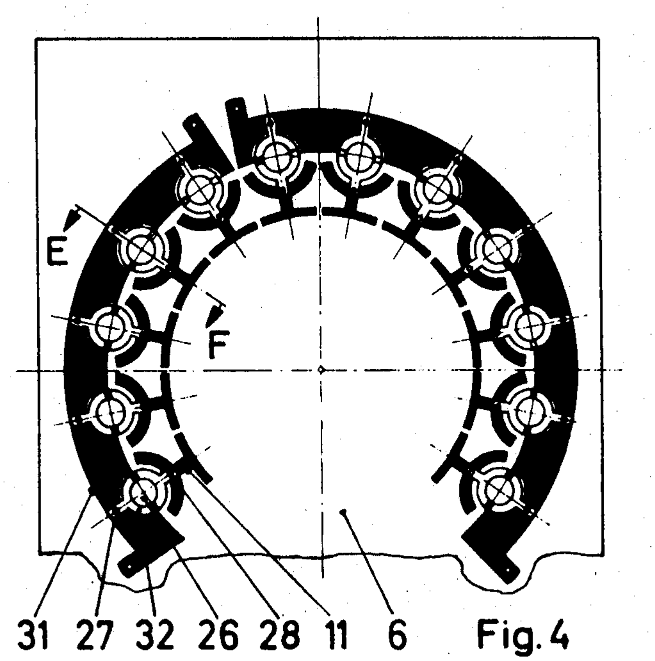
FIG. 4 shows a further modification of the arrangement shown in FIG. 2.

As shown in FIGS. 4 and 4*a*, the sections 11 of the contact lead as well as the resistance leads 25 may also be arranged on one side of the board of insulating material 6. The resistance leads may likewise also consist of punched-out carbon-coated hard-paper segments 31 which are rivetted to the board of insulating material 6. For the purpose of establishing the electrical connection between the segments 31 and the sections 11 of the contact lead there is used a self-resilient, substantially circularly shaped flat spring 32 comprising two spring arms extending radially towards the outside and which, at their free ends, are designed as slide springs 27, 28. This flat spring, in turn, is retained in position by a rotor having the shape of 9 mechanical sleeve (hub, jack) 26 which is supported in the board of insulating material 6 capable of performing a rotary movement and which, on its side facing the tuning button 15, is provided with an internal gear 21 for engaging the bevel-gear drive of the tuning element 5.

The voltages as tapped off the resistance leads 7, 25 or the segments 31 with the aid of the sliding contacts (contact sliders) 10 or the slide springs 22, 27, 28 respectively, are transferred with the aid of a self-resilient sliding contact 33 as retained by the rotary knob 2, to a through-going contact lead 34 arranged concentrically in relation to the sections 11 of the contact leads, with the contact lead 34 being printed on to the board of insulating material 6 and inserted into the circuit of the varactor diode. This contact lead is associated with further through-going and subdivided contact leads 35, 36, 37, 38 extending concentrically in relation thereof, of which each time one through-going contact lead (35, 38) may be electrically connected to a subdivided contact lead 36, 37 with the aid of further sliding contacts 39 and or 40 as retained in position by the rotary knob 2 respectively. In this way it is possible to effect a changeover of the operating and switching voltages and, consequently, to carry out also a switchover as regards the frequency range.

For setting the rotary selector 1 from one position to the next one, there is used an engaging mechanism of the star or ball engaging type. In the example of embodiment shown in FIGS. 1 and 2 each time two ball-shaped (spherical) externally resilient hold members 41 of the rotary knob 2 are in the engaging position in an operational connection with cylindrical boreholes 42 serving as the engaging means. This ball-type engaging arrangement arrests the rotary knob 2 each time in a position in which the tuning button 15 comes to lie vertically above a centering pin 18 or a rotor 20 or a mechanical sleeve 26 respectively, so that upon depression of the tuning button the associated bevel-gear 17 will come into engagement with the bevel-gear 14 of a spindle type potentiometer, or else with the internal gear 21 of a rotary potentiometer.

For the purpose of indicating the tuning of the freely selectable stations (transmitters) within the UHF-range, it is possible, in the conventional way, to provide dials with pointers, with the driving mechanism thereof being coupled to the spindle potentiometer drive. The indication of the predetermined stations within the VHF-range, however, can be effected simply by marking the associated channel numbers.

We claim:

1. A tuning arrangement for receivers comprising:

a base;

a rotatable knob for selecting various stations to be received coupled to said base;

means on said base for establishing predetermined fixed positions into which said knob can be set;

a single tuning button having a manipulating end and an engaging end;

means for mounting said tuning button on said knob;

a plurality of stationary adjustable tuning means mounted on said base concentrically with respect to said knob and each located opposite one of said predetermined positions; and said mounting means including means coupled between said button and said knob for movably mounting said tuning button so as to enable movement of said button into and out of engagement with the tuning means at each said position.

2. A tuning arrangement for according to claim 1, wherein each of said plurality of adjustable tuning means comprises a potentiometer.

3. A tuning arrangement for receivers according to claim 1, wherein said movable mounting means includes spring return means.

4. A tuning arrangement for receivers according to claim 1, wherein said tuning button is peripherally mounted on said knob and is, at the engaging end, generally in the form of a truncated cone having external gear teeth.

5. A tuning arrangement for receivers according to claim 4, wherein at least some of said tuning means include linear potentiometers each terminating at one end in the form of truncated cones, said one end being the end provided for engagement with the engaging end of said single tuning button, and having external gear teeth formed on said truncated cone for engagement with the gear teeth of said tuning button.

6. A tuning arrangement for receivers according to claim 4, wherein at least some of said tuning means include rotary potentiometers terminating at one end in an internal gear generally in the form of a toothed truncated cone for engagement with the gear teeth of said tuning button.